May 24, 1932.  C. H. BAILEY  1,859,613
FERMENTATION CABINET
Filed April 28, 1930   3 Sheets-Sheet 1

INVENTOR
CLYDE H. BAILEY
BY Paul, Paul & Moore
ATTORNEYS

May 24, 1932. C. H. BAILEY 1,859,613
FERMENTATION CABINET
Filed April 28, 1930   3 Sheets-Sheet 2

INVENTOR
CLYDE H. BAILEY
BY
ATTORNEYS

Patented May 24, 1932

1,859,613

UNITED STATES PATENT OFFICE

CLYDE H. BAILEY, OF ST. PAUL, MINNESOTA, ASSIGNOR TO GENERAL MILLS, INC., OF MINNEAPOLIS, MINNESOTA, A CORPORATION OF DELAWARE

FERMENTATION CABINET

Application filed April 28, 1930. Serial No. 448,149.

This invention relates to an improved fermentation cabinet adapted for use in connection with biological work as, for example, the fermentation of bread doughs, and various other materials.

An object of the invention is to provide a fermentation cabinet including one or more chambers adapted to contain the material to be treated, and each chamber having air intake and discharge openings provided with means for controlling circulation through the chamber, and an air conditioning compartment being provided in the cabinet through which all of the air must pass before being delivered to the fermentation chambers.

A further object is to provide a cabinet of the class described comprising one or more horizontally disposed fermentation chambers each communicating at one end with an air distributing passage and at their opposite ends with return air passages, said air passages communicating with an air conditioning compartment having means therein for restoring the returned air to a predetermined temperature and humidity, whereby the air delivered into the fermentation chambers will be maintained at a constant temperature and humidity requisite for the material to be treated.

A further object is to provide a fermentation cabinet comprising a plurality of fermentation chambers arranged in superposed relation and each connected at one end with a vertically disposed air distributing passage and at their opposite ends with an upright air return passage, means being provided for controlling and regulating the circulation of air from the distributing passage into said chambers, and an air conditioning compartment being provided adjacent to said chambers and connecting with said air return passage whereby the air discharging from said chambers will pass through said compartment, the latter including a suitable air cooling means, a heating means, a humidifying means, and means for circulating the conditioned air throughout the apparatus; suitable means being provided for controlling the operation of all of said means whereby the air returning from the fermentation chambers, when subjected to the action of said means, may be brought to the desired temperature and the necessary amount of moisture or water vapor added thereto, so that the air being supplied to the fermentation chambers will be of a constant temperature and humidity and requisite for the particular material to be treated.

Other objects of the invention will appear from the following description and accompanying drawings and will be pointed out in the annexed claims.

In the accompanying drawings, there has been disclosed a structure designed to carry out the various objects of the invention, but it is to be understood that the invention is not confined to the exact features shown as various changes may be made within the scope of the claims which follow.

The development of a satisfactory fermentation cabinet presents problems common to many phases of biological investigations which involve temperature and humidity control. It is an object of this invention to provide a fermentation cabinet provided with the necessary means for maintaining constant the temperature and humidity of the air circulated through the various fermentation chambers of the cabinet.

Fermentation chambers

Figure 1:
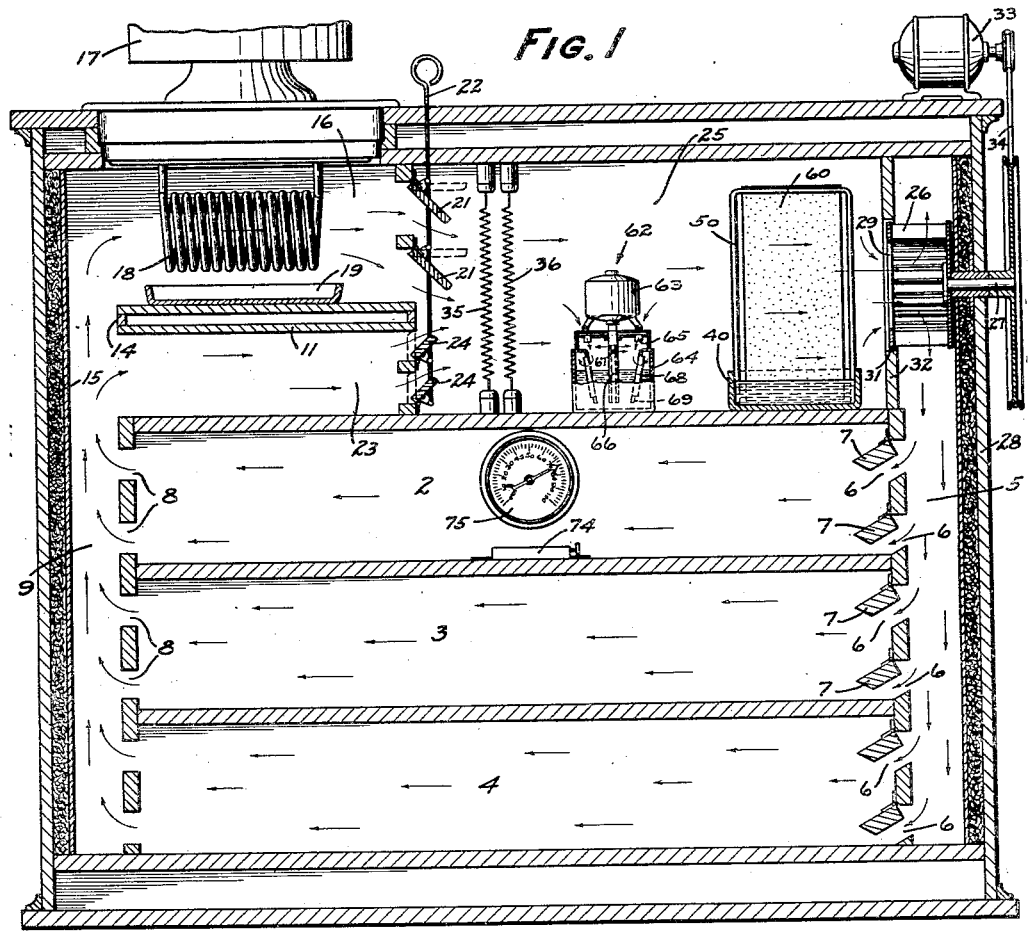
Figure 1 is a vertical sectional view illustrating the general construction of the cabinet and the arrangement of the parts therein.

In the present instance, a cabinet is shown comprising three fermentation chambers, indicated by the numerals 2, 3, and 4, in Figure 1. An air distributing passage 5 is shown at one end of the cabinet which communicates with the chambers 2, 3, and 4 by means of suitable intake openings 6, each provided with a valve or louvre 7, whereby the circulation of air through the chambers may be controlled. These louvres are desirably provided with suitable means (not shown) whereby they may be actuated exteriorly of the cabinet. One or more discharge openings 8 are provided at the opposite end of each fermentation chamber, which communicates with a return air passage 9.

The means for conditioning the air delivered to the air distributing passage 5 is here shown located in the upper portion of the cabinet, and consists of an air cooling means, a heating means, and a humidifying means.

Air cooling means

Figure 2:
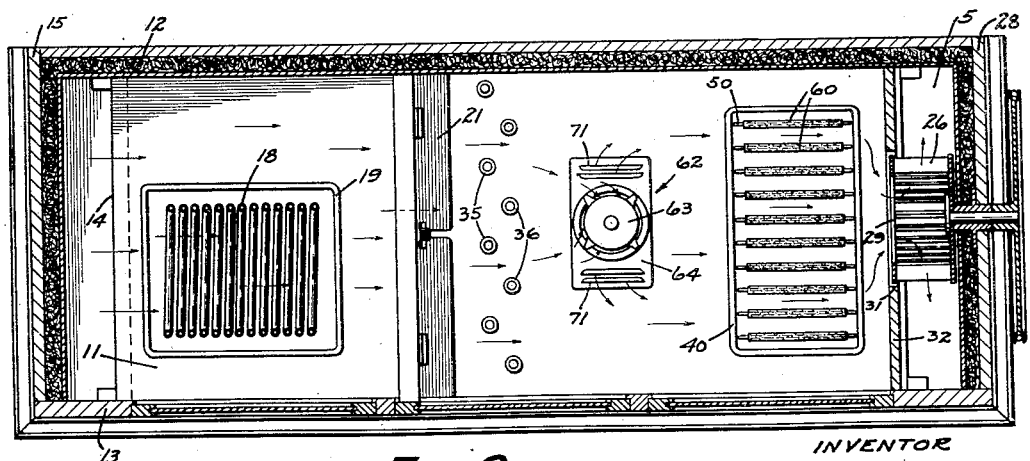
Figure 2 is a horizontal plan view through the upper portion of the cabinet.

A horizontally disposed insulated wall 11 is shown located in the upper left hand corner of the cabinet and has its rear and front edges connected with the rear and front walls 12 and 13, respectively, of the cabinet, as will be seen by reference to Figure 2. The edge 14 of the horizontal wall 11 is spaced from the end wall 15 of the cabinet to provide a gap through which air may circulate upwardly and through a cooling or refrigerant compartment 16, wherein the air is cooled. In the drawings, there is shown a refrigerating unit 17, of ordinary well-known construction, comprising a coil 18 positioned to act upon the air circulating through the cooling compartment 16, thereby to lower the temperature of the circulated air. If desired, other refrigerant means may be utilized such, for example, as a cake of ice which may be supported in a shallow pan 19, shown positioned upon the horizontal wall 11.

Dampers 21 are provided at the discharge side of the cooling chamber 16 having an operating rod 22 shown positioned exteriorly of the cabinet, whereby the dampers 21 may be opened and closed to control the circulation of air from the cooling compartment 16.

Directly beneath the wall 11, there is shown a by-pass 23 which communicates with the return air passage 9 at one end and having its opposite end provided with dampers 24, here shown operatively connected with the operating rod 22 for simultaneous operation with the dampers 21. By thus operatively connecting together the dampers 21 and 24, it will be seen that when the dampers 21 are opened to their fullest extent, as indicated by the dotted lines in Figure 1, the relatively smaller dampers 24 of the by-pass will be substantially closed, thereby causing substantially all of the return air to pass through the cooling compartment 16. Should the temperature of the returning air be sufficiently low to make it unnecessary to further cool it, the dampers 21 are closed, whereby the dampers 24 will be opened so that all of the air returning from the fermentation chambers will flow through the by-pass 23 and will not be affected by the refrigerant or cooling medium provided in the compartment 16. At times it may be desirable to partially open all of the dampers 21 and 24, as shown in full lines in Figure 1, whereby the return air current will be divided, a portion of it flowing through the cooling compartment 16 and the remaining portion through the by-pass 23.

Air circulating means

A means for circulating the air within the cabinet is shown in the upper right hand corner of Figure 1, at one end of a compartment 25 adapted for communication with the compartment 16 and by-pass 23 by means of the dampers 21 and 24, respectively. The air circulating means here shown consists of a suitable fan 26 secured to a shaft 27 supported in a suitable bearing secured to the end wall 28 of the cabinet. The intake 29 of the fan is positioned in an opening 31 provided in a partition 32 separating the air distributing passage 5 from the compartment 25. A means for operating the fan is shown in Figure 1, and consists of a motor 33 which may be mounted on top of the cabinet and operatively connected with the shaft 27 by means of a suitable drive 34. When the fan 26 is rotated, air will be drawn through the cooling compartment 16, if the dampers 21 are open, and into the compartment 25, from whence it will be delivered into the air distributing passage 5 for distribution into the various fermentation chambers, as will readily be understood by reference to Figure 1.

Air heating means

The means for supplying the circulated air with the necessary heat energy is here shown as consisting of a plurality of heating elements or coils 35 and 36 arranged in spaced parallel relation, as shown in Figures 1 and 2, whereby the air discharging from the cooling compartment 16 and by-pass 23 may impinge against said heating elements. These heating coils are mounted in the compartment 25 and preferably arranged transversely thereof, as shown in Figure 2.

Figure 4:
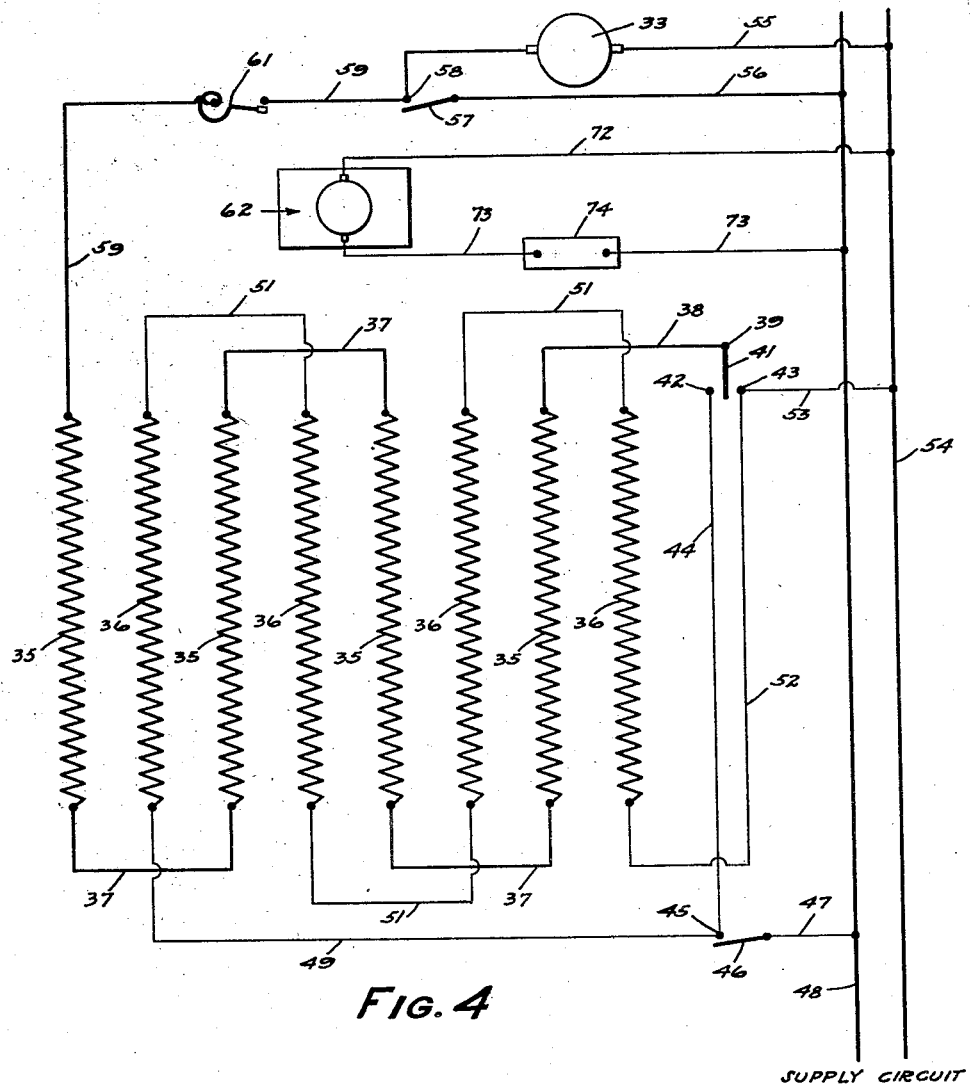
Figure 4 is a wiring diagram disclosing the heating circuit.

The heating elements 35 and 36 are preferably connected, as shown in the diagram illustrated in Figure 4, whereby wires 37 connect the coils 35 together for series operation. A wire 38 is connected to a terminal 39 of a suitable switch 41, which is selectively movable into and out of engagement with a pair of contacts 42 and 43. The contact 42 is connected by a wire 44 to a contact 45 of a suitable switch 46, connected by a wire 47 to a conductor 48 of an electric supply circuit. The contact 45 has a wire 49 connecting it with the heating coil 36, shown at the left hand side of Figure 4, and the coils 36 are connected together for series operation by suitable connections 51. The heating coil 36 at the right hand side of Figure 4 is shown having a wire 52 connecting it with the contact 43 of the switch 41. The contact 43 is connected by a wire 53 to the conductor 54 of the supply circuit.

The blower motor 33 is shown connected across the main line wires 48 and 54 by means of conductors 55 and 56, the latter having a suitable switch 57 interposed therein which is provided with a fixed contact 58. A wire 59 connects the fixed contact 58 of the switch 57 with the opposite end of the heating coil 35, as shown at the left hand side of Figure 4. A suitable thermo-regulator 61, of ordinary construction, is operatively connected in the wire 59 and functions to automatically control the operation of the heating coils. The thermo-regulator 61 is so located as to be affected by variation in the temperature of the conditioned air.

By connecting the heating coils with the supply circuit, as above described, three different heats may be obtained as, for example, low, medium, and high, by simply actuating the switches 41 and 46, it being understood that the switch 57 is closed whenever the cabinet is operating. This switch, in addition to controlling the supply of current to the heating coils, also controls the operation of the blower motor 33.

When it is desired to operate the cabinet with low heat, the switch 41 is actuated to close the gap between the contacts 39 and 42, and the switch 46 is opened as shown in Figure 4. When the switches are thus positioned, all of the coils 35 and 36 are connected for series operation. When medium heat is requred, the switch 41 is actuated to bridge the gap between the contacts 39 and 43, while the switch 46 is still open, whereby the coils 35 only will function; the coils 36 being cut out of the supply circuit. Because of the coils 36 being cut out of the circuit, the remaining coils 35 will be operated at a higher temperature, as is well known, resulting in medium heat being supplied. When high heat is required, the switch 41 is moved into electrical connection with the contact 42, and the switch 46 is closed. When the switches 41 and 46 are thus positioned, the coils 35 and 36 will operate in parallel, as will readily be understood by reference to the wiring diagram, thereby causing the heat generated by the coils 36 to be additive to the heat generated by coils 35, resulting in high heat being supplied.

When the two sets of coils 35 and 36 are connected for parallel operation, electric current flows continuously through coils 36, while the flow of current through coils 35 will be controlled by the thermo-regulator 61, which is connected in series therewith. This thermo-regulator, as hereinbefore stated, is located so as to be affected by variation in the temperature of the conditioned air, and functions to maintain the circulated air at a predetermined temperature.

*Humidifying means*

Means are provided for supplying the necessary water vapor or moisture to the air circulated through the fermentation chambers to maintain the humidity of the atmosphere in said chambers at a level which will obviate the crusting of exposed surfaces of the material being treated such, for example, as dough. To thus introduce moisture or water vapor into the air circulated through the cabinet, there is shown at one end of the chamber 25, a moisture dispensing means comprising a shallow pan 40 connected with a suitable source of water supply, not shown. Suitable upright supports 50 are provided in the pan 40 and arranged in spaced relation, as best shown in Figure 2. Suitable wicks 60 are suspended from the supports 50 with their lower ends dipping into the water contained in the pan 40. The wicks are preferably arranged in front of the intake opening 29 of the fan 26 so that substantially all of the air drawn into the fan will pass between the moistened wicks 60. The amount of moisture introduced into the circulating air may be varied by changing the number of wicks 60 supported in the pan 40. For example, if one or more of the wicks are removed, less moisture will be introduced into the air, and obviously, if more wicks are added, more moisture will be introduced into the air. By arranging the wicks as shown in Figures 1 and 2, a maximum of evaporating surface is provided with very little interference with air movement.

In some instances, it may be desirable to provide an additional humidifying unit, preferably of the automatically controlled type, such as the well-known Bahnson humidifier. Such a unit is indicated by the numeral 62 in Figures 1 and 2. Briefly, it comprises a motor 63 mounted upon a suitable tank 64 and having a fan 65 secured to a tubular shaft 66, the lower end of which is submerged in water contained in the tank 64. Rotation of the tubular shaft or member 66 will cause water to be drawn upwardly therethrough and discharged radially therefrom through small apertures 67 provided in the upper portion of the shaft, directly beneath the fan 65. The air discharging from the apertures 67 will be blown downwardly by the fan 65 and through openings 68 provided in an intermediate wall 69 of the humidifier, and into opposite ends of the tank 64, from which the air is discharged through openings 71 provided in the top wall thereof. The air is drawn downwardly by the action of the fan 65, into contact with the water spraying from the apertures 67, as indicated by the arrows in Figure 1.

The motor of the humidifying unit 62 is preferably connected with the electric supply circuit by wires 72 and 73, as shown in Figure 4. An automatic control device 74, diagrammatically illustrated in Figure 4, is interposed in the motor circuit and functions to automatically control the operation of the humidifier 62 by opening and closing the motor circuit, as the humidity or moisture content of the air varies. In other words, the control device 74 may be adjusted to automatically open the motor circuit when the humidity in the cabinet reaches a predetermined high level, and, conversely, when the humidity drops to a predetermined low level, the device 74 will automatically close the circuit to cause the humidifier 62 to introduce additive moisture to the circulating air. By the utilization of the two humidifiers herein described, the wicks 60 of the larger humifier will supply the major portion of the requisite water vapor, while the smaller automatically controlled Bahnson humidifier may serve as a "booster" which supplies the additional quantity of water vapor or moisture necessary to the maintenance of the desired humidity.

A suitable hygrometer 75, of ordinary construction, is conveniently positioned within the cabinet as, for example, in the upper fermentation chamber 2, so that an attendant may readily note the moisture content or humidity of the air passing through the fermentation chambers.

Figure 3:
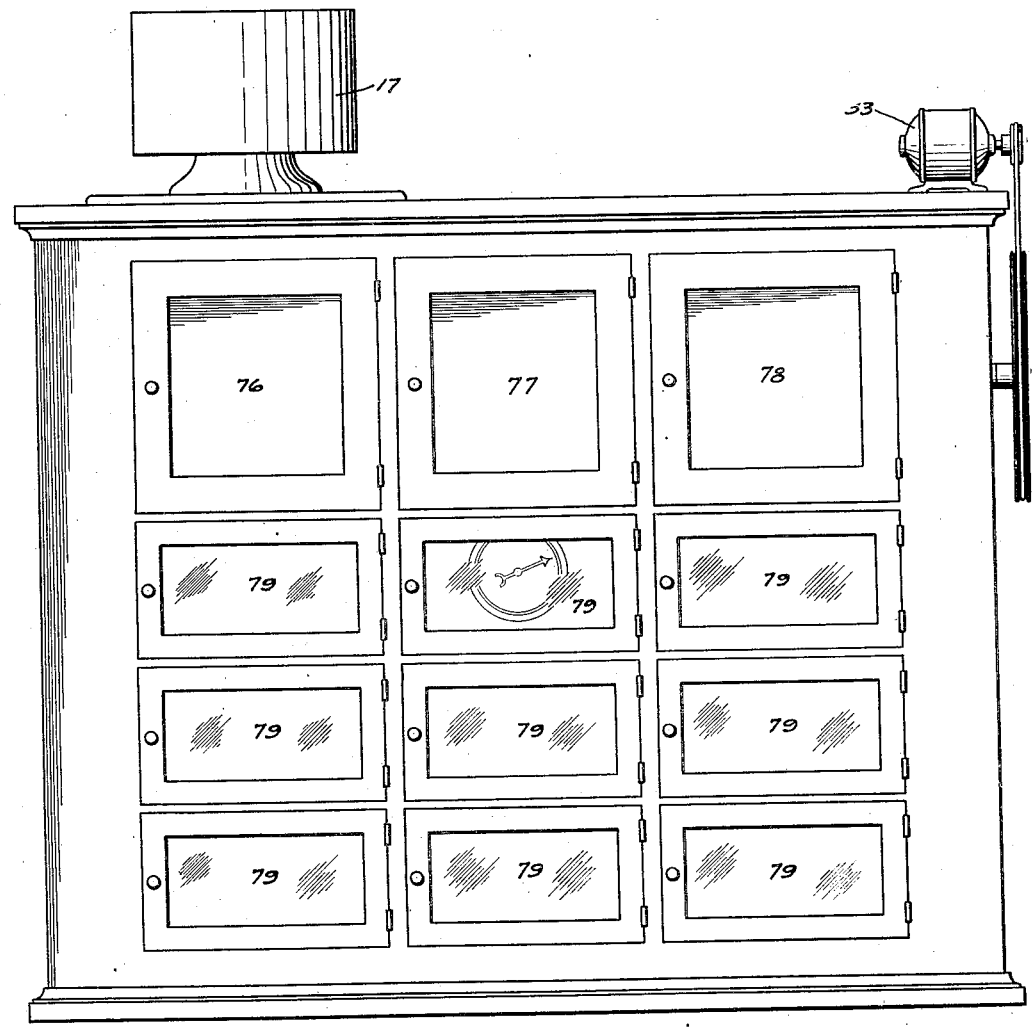
Figure 3 is a front elevation of the cabinet.

As shown in Figure 3, the cooling compartment 16 and by-pass 23 are provided with a suitable door 76 and similar doors 77 and 78 are provided for the humidifying and heating compartment 25. Glazed doors 79 are also provided for the fermentation chambers 2, 3, and 4, whereby convenient access may be had thereto. The hygrometer 75 may readily be viewed from the exterior of the cabinet through the glazed panel of the door 79 alined therewith.

To maintain a constant temperature in a cabinet of the character herein described, frequently necessitates the release of heat energy into the air circulated therethrough, equivalent to the heat energy being lost. Since heat energy must commonly be released at a limited number of points within the cabinet, it becomes necessary to promptly and effectively distribute this added heat energy throughout this space. This may be practically effected by means of the heating elements 35 and 36 hereinbefore described, and their associated switches 41, 46, and 57. At certain seasons of the year, particularly in the summer months, the temperature of the atmosphere in the room may at times be above that which is desired in the cabinet. Under such circumstances, heat energy tends to move into the cabinet from the warmer atmosphere without, and it then becomes necessary at times to cool the air within the cabinet. This may be conveniently accomplished by the simple manipulation of the control rod 22, whereby all or a part of the return flow of air may be directed through the cooling compartment 16, as indicated by the arrows in Figure 1.

Humidity control is also desirable for the most effective operation of such a cabinet. In the winter months in particular, it becomes necessary to vaporize a considerable quantity of water in order to maintain the humidity of the atmosphere within the cabinet at a level which will obviate the crusting over of exposed surfaces of the material being treated in the fermentation chambers 2, 3, and 4, as hereinbefore stated. The humidifying means hereinbefore described affords means whereby the humidity within the cabinet may be controlled to a predetermined degree.

From the foregoing, therefore, it will be seen that by the utilization of the described facilities for warming and cooling the air, the means for adding water vapor or moisture to the air, and the means for circulating the conditioned air through the dough chambers, the circulated air may be maintained at a constant temperature and humidity. The novel cabinet herein disclosed is also very simple and inexpensive in construction, comprises few movable controls, and will readily lend itself for use in many phases of biological investigations which involve temperature and humidity control.

I claim as my invention:

1. A fermentation cabinet comprising a plurality of horizontally disposed chambers having suitable air intake and discharge openings, said cabinet also having therein an upright air distributing passage communicating with said intake openings and an upright air return passage communicating with said discharge openings, an air cooling medium located in said cabinet whereby the air discharging from said chambers may be cooled before being returned thereto, a heating means also positioned to be engaged by the circulating air and adapted to heat the air when necessary, means for circulating the air through said chambers within the cabinet, and means for subjecting all or a part of the return air to the action of said cooling means to maintain the circulated air at a constant temperature.

2. A fermentation cabinet comprising a plurality of chambers each provided at one end with an air intake opening and at their opposite ends with suitable discharge openings, said cabinet also having therein an upright air distributing passage communicating with said intake openings and with an upright air return passage communicating with the discharge openings of said chambers and with an air cooling compartment located adjacent to said chambers, a heating means positioned in the cabinet adjacent to said air cooling compartment, a by-pass, means for circulating the air within the cabinet, and means for controlling the flow of return air from said chambers whereby all or a part of the air may be diverted through said air cooling compartment to be cooled, said control means also providing means whereby all or a part of the circulated air may be diverted through said by-pass to prevent cooling of the air.

3. A fermentation cabinet comprising a plurality of horizontally disposed chambers each provided at one end with an air intake opening and at their opposite ends with suitable discharge openings, said cabinet also having an upright air distributing passage communicating with said intake openings and an upright air return passage communicating with the discharge openings of said chambers and with a compartment located above said horizontally disposed chambers, a cooling medium located in said compartment adapted to cool the air received from said chambers, a by-pass beneath said cooling compartment, an air heating means, means for circulating the air through said chambers within the cabinet, and means selectively operable to cause the return air to flow either through said cooling compartment or through said by-pass, or simultaneously through both, said cooling medium and said heating means cooperating to maintain the circulated air at a constant temperature.

4. A fermentation cabinet comprising a plurality of horizontally disposed chambers communicating at their ends with upright air circulation passages, said cabinet having a compartment therein communicating with said passages and provided with means for circulating the air within the cabinet, a cooling medium, a heating element, means for introducing moisture into the circulated air, and means for controlling the operation of the cabinet so as to maintain the circulated air at a constant temperature and predetermined humidity.

5. A cabinet comprising a plurality of horizontally disposed chambers communicating at their ends with upright air circulation passages, said cabinet having a compartment therein communicating with said passages and provided with means for circulating the air within the cabinet, a cooling medium, heating elements, means for introducing moisture into the circulated air, means for subjecting all or a part of the circulated air to the action of said cooling medium, and means automatically operable to control the operation of said heating elements and said humidifying means whereby the circulated air may be maintained at a constant temperature and humidity.

6. A cabinet comprising a purality of horizontally disposed fermentation chambers arranged one above another and communicating at their ends with upright air circulation passages, means for controlling the circulation of air through each chamber, said cabinet having a compartment therein disposed above said fermentation chambers and communicating with said air passages, a fan at one end of said compartment for circulating air within the cabinet through said air passages and fermentation chambers, air-cooling means at the opposite end of said compartment, means for causing all or a part of the circulated air to be subjected to the action of said air-cooling means, heating elements in said compartment capable of heating the circulated air, means responsive to temperature changes to automatically control the operation of said heating elements, and to maintain the air at a constant temperature, humidifying means also in said compartment adapted to introduce moisture into the circulated air, and means for automatically controlling the operation of said humidifying means whereby the circulated air may be maintained at a constant humidity.

7. A cabinet comprising a plurality of horizontally disposed fermentation chambers arranged one above another and communicating at their ends with upright air circulation passages, said cabinet having a compartment therein disposed above said fermentation chambers and communicating with said air passages, a fan at one end of said compartment for circulating air within the cabinet through said air passages and fermentation chambers, air-cooling means at the opposite end of said compartment, heating elements in said compartment capable of heating the circulated air, means responsive to temperature changes to automatically control the operation of said heating elements and thereby maintain the air at a constant temperature, humidifying means also in said compartment adapted to introduce moisture into the circulated air, and means for automatically controlling the operation of said humidifying means whereby the circulated air may be maintained at a constant humidity.

8. A fermentation cabinet comprising a plurality of horizontally disposed fermentation chambers communicating at their ends with suitable air circulation passages, said cabinet having a compartment therein communicating with said passages and provided with means for circulating the air within the cabinet, a cooling medium, a heating means, means for introducing moisture into the circulated air, and means for controlling the operation of the cabinet so as to maintain the circulated air at constant temperature and predetermined humidity.

In witness whereof, I have hereunto set my hand this 26th day of April, 1930.

CLYDE H. BAILEY.